(12) United States Patent
Wilson et al.

(10) Patent No.: US 10,492,358 B1
(45) Date of Patent: Dec. 3, 2019

(54) SMALL SEED COUNTING SYSTEM

(71) Applicant: DuBois Agricultural Engineering Incorporated, West Des Moines, IA (US)

(72) Inventors: Robert William Wilson, Des Moines, IA (US); Nathan Paul Davis, West Des Moines, IA (US); Jerry DuBois, West Des Moines, IA (US)

(73) Assignee: DuBois Agriculture Engineering Incorporated, West Des Moines, IA (US)

( * ) Notice: Subject to any disclaimer, the term of this patent is extended or adjusted under 35 U.S.C. 154(b) by 0 days.

(21) Appl. No.: 16/229,503

(22) Filed: Dec. 21, 2018

(51) Int. Cl.
*A01C 7/10* (2006.01)
*B65B 57/20* (2006.01)

(52) U.S. Cl.
CPC .............. *A01C 7/105* (2013.01); *B65B 57/20* (2013.01)

(58) Field of Classification Search
CPC ................................ A01C 7/105; B65B 57/20
See application file for complete search history.

(56) References Cited

U.S. PATENT DOCUMENTS

| | | | | |
|---|---|---|---|---|
| 3,512,002 A | * | 5/1970 | Decker | G06M 1/101 377/6 |
| 8,022,353 B2 | * | 9/2011 | Leuenberger | A01C 7/105 250/222.2 |
| 8,393,502 B2 | * | 3/2013 | Renyer | A01C 7/08 220/211 |
| 9,575,210 B2 | * | 2/2017 | Liebich | A01C 21/00 |
| 2008/0265141 A1 | | 10/2008 | Leuenberger et al. | |
| 2012/0017812 A1 | * | 1/2012 | Renyer | A01C 7/08 111/130 |
| 2015/0293257 A1 | * | 10/2015 | Liebich | A01C 21/00 701/50 |

FOREIGN PATENT DOCUMENTS

CN     205770230     * 12/2016
CN     208922320     *  5/2019

* cited by examiner

*Primary Examiner* — Sisay Yacob
(74) *Attorney, Agent, or Firm* — Zarley Law Firm, PLC

(57) ABSTRACT

A small seed counting system includes a hopper mounted to a frame and having an open top and a discharge opening. Also connected to the frame is a vertical rail. Mounted to the vertical rail are a first and a second gate assemblies. Each gate assembly has a horizontal support member with an aperture. The gate assemblies also each have a measuring tube that are slidably and telescopically connected to form a measuring chamber.

6 Claims, 4 Drawing Sheets

SMALL SEED COUNTING SYSTEM

BACKGROUND OF THE INVENTION

This invention is directed to a system for counting seeds and more particularly for counting small seeds such as wheat, spices, and the like.

Devices for counting small seeds are known in the art. Most of these devices utilize photo electric sensors and/or imaging software. Other known devices include electronic measuring systems that utilize infrared sensors or the like that sense the passage of seed through a tube or a chute as the seed is dispensed from the chute.

Unfortunately, known devices have limited image capturing capabilities and cannot effectively count multiple objects passing by the sensors. These systems also are complex and expensive to manufacture. Alternatives are tedious and time consuming. Accordingly, a system is needed that addresses these deficiencies.

An objective of the present invention is to provide a small seed counting system having increased speed without a loss in accuracy.

Another objective of the present invention is to provide a small seed counting system that is more economical to manufacture.

These and other alternatives will be apparent to those having ordinary skill in the art based upon the following written description, drawings, and claims.

SUMMARY OF THE INVENTION

A small seed counting system includes a hopper mounted to a frame. The hopper has an open top and a discharge opening at the bottom. Also mounted to the frame is a vertical rail.

Connected to the rail, below the hopper, is a first and a second gate assembly that are in a spaced parallel relation. The gate assemblies each have a horizontal support member having an aperture that is in vertical alignment with the discharge opening of the hopper. The horizontal support members also have a slot that extends from one end of the support member to the aperture. Slidably received within the slot is a gate that is operatively connected to a cylinder. The gates selectively prevent seed from flowing through the apertures of the support members.

Measuring tubes are connected to and between the gate assemblies and are sized and positioned so that one measuring tube is slidably and telescopically received with the other measuring tube to form a measuring chamber. One of the gate assemblies is slidably attached to the vertical rail to selectively adjust the volume of the measuring chamber.

A control system is connected to a plurality of cylinders that control the operation of the gates and the position of a gate assembly on the vertical rail. Based upon a specific type of seed, the control system adjusts that position of the gate assembly on the vertical rail so that the volume of the measuring chamber equals the requested number of seeds or weight that is input into the control system by an operator.

DETAILED DESCRIPTION

Figure 1:
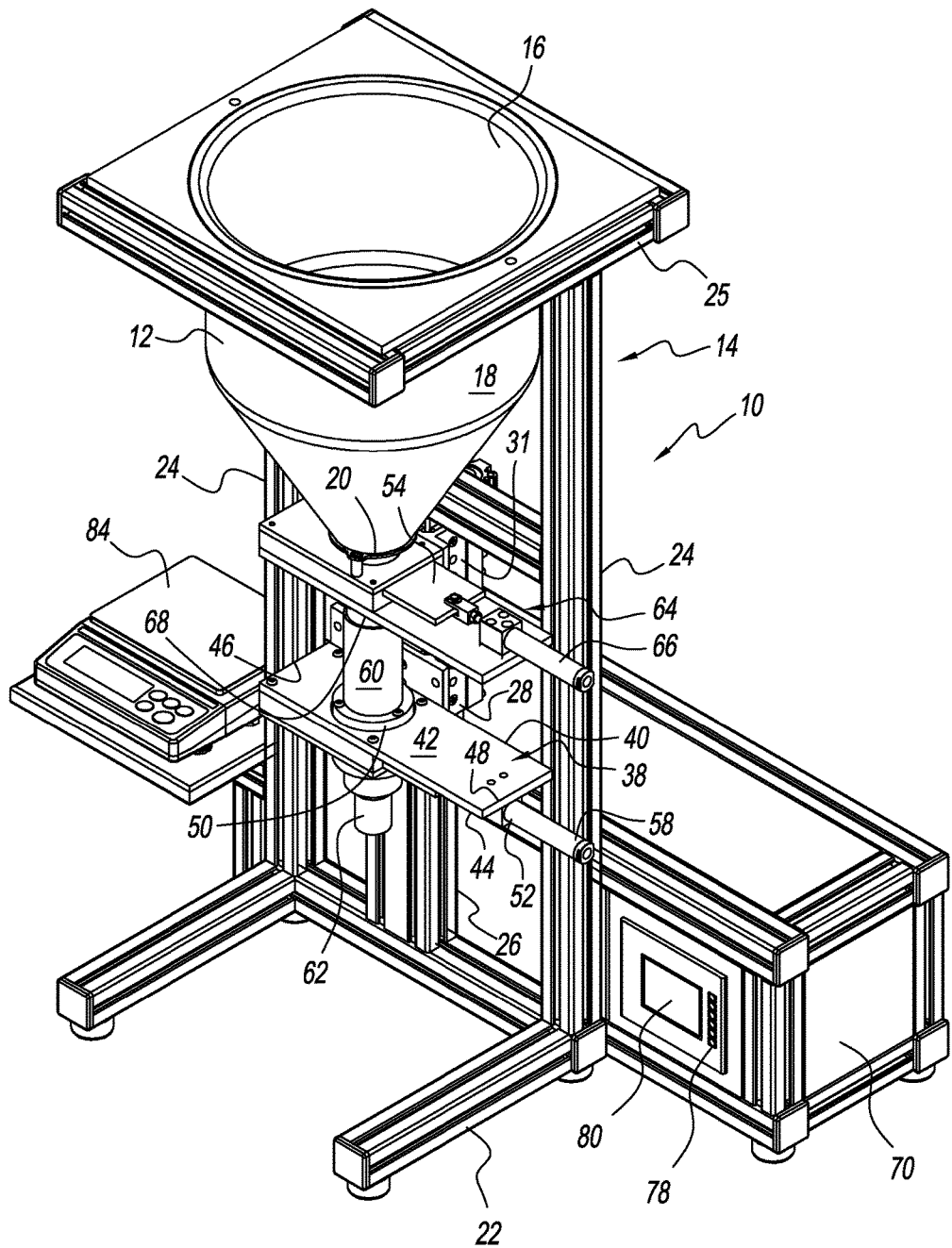
FIG. 1 is a perspective view of a small seed counting system.
Figure 2:
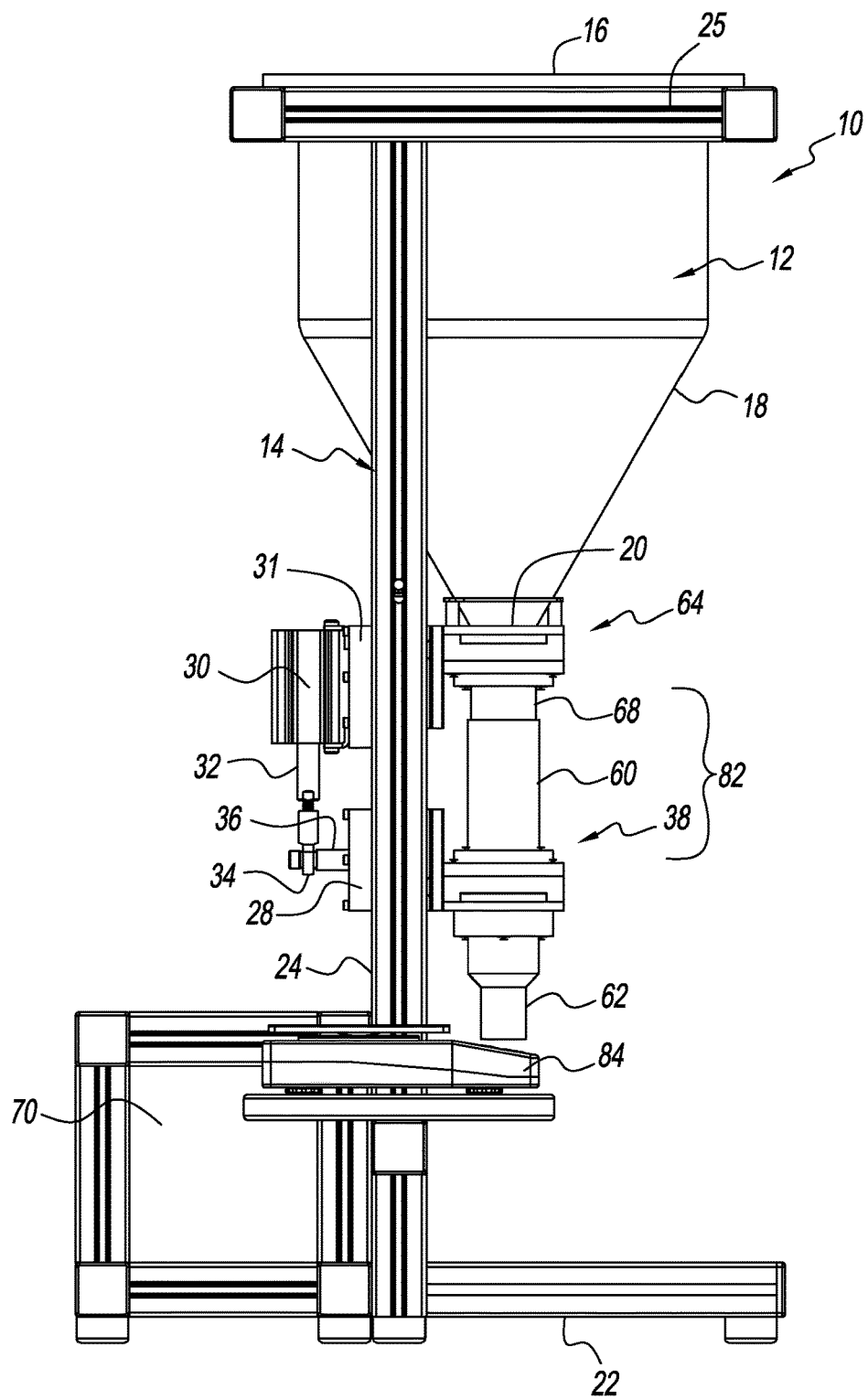
FIG. 2 is a side view of a small seed counting system.
Figure 3:
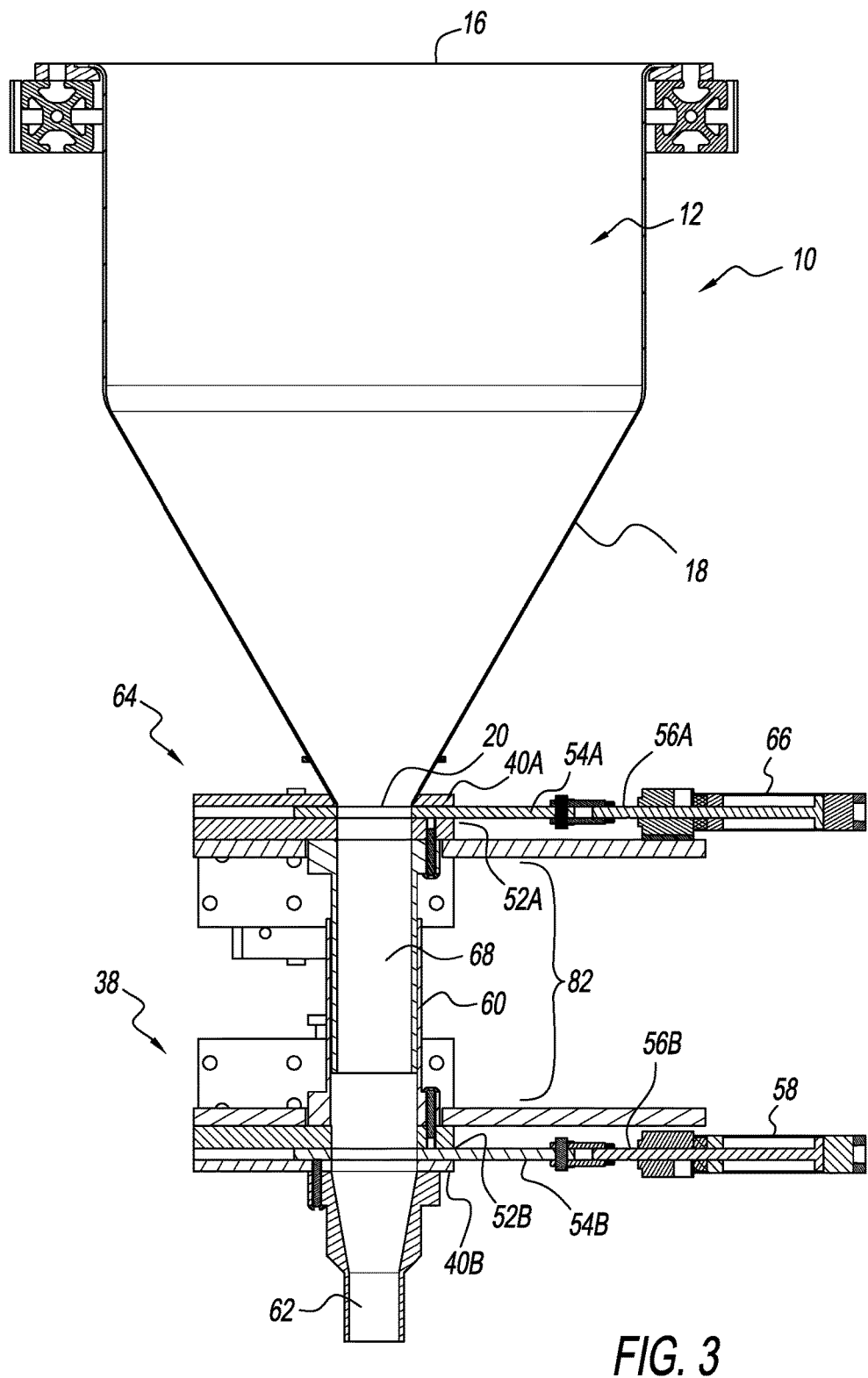
FIG. 3 is a partial front sectional view of a small seed counting system.
Figure 4:
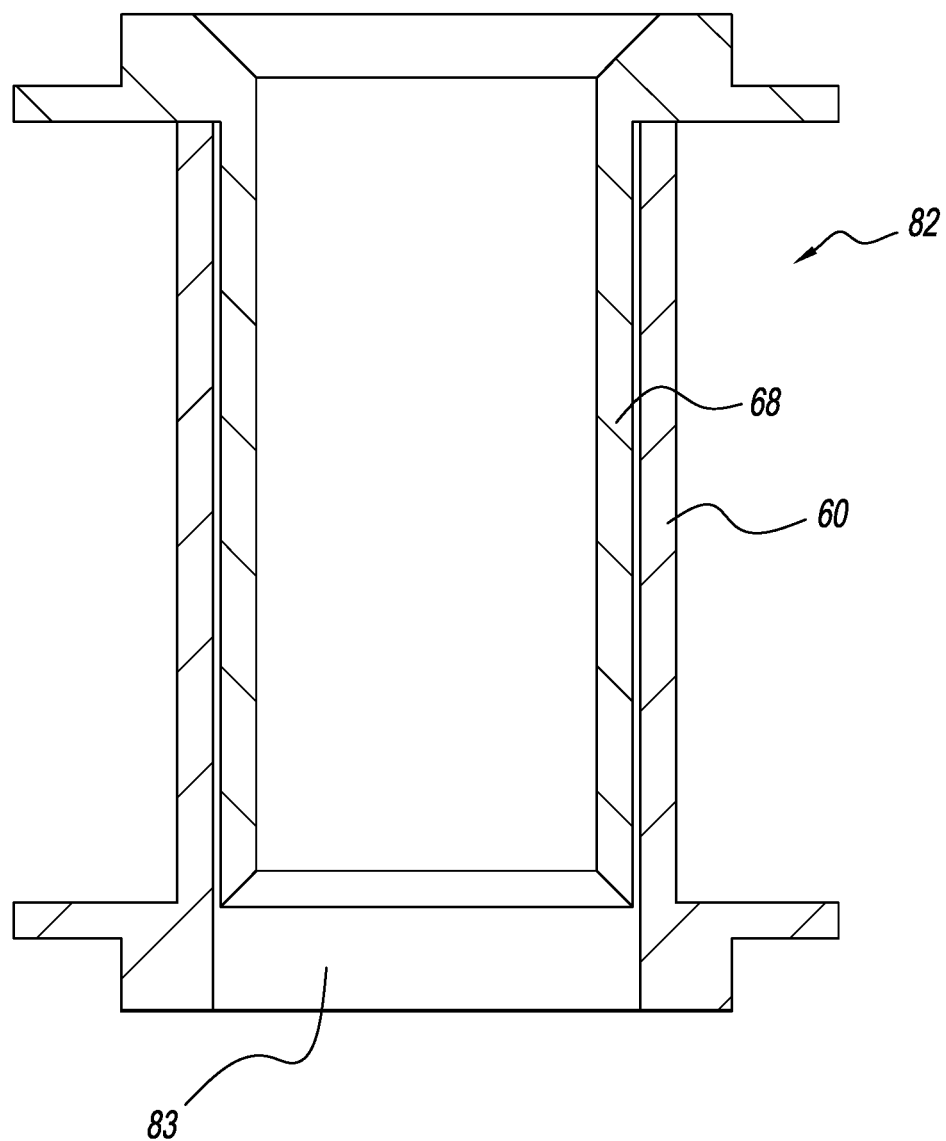
FIG. 4 is a side sectional view of a measuring chamber.

Referring to the Figures, a small seed counting system 10 includes a hopper 12 mounted to a frame 14. The hopper 12 is of any size, shape, or structure and in one example has an open top 16, a sidewall 18 that tapers or is angled inwardly and terminates into a discharge opening 20. Likewise, the frame 14 is of any size, shape, or structure and in one example has a base 22 with a plurality of support members 24 that extend upwardly and vertically from the base 22. A horizontal support 25 is connected to the end of support members 24 and the hopper 12.

A vertical rail 26 is connected to the frame 14 on a rear side. Slidably attached to the vertical rail 26 is a mounting guide bracket 28. A first cylinder 30 is connected to a fixed mounting bracket 31 and has a rod, shaft, or piston 32 that slidably extends toward and away from the first cylinder 30 in a downward vertical direction. The lower end 34 of shaft 32 is connected to a transverse horizontal member 36 that extends from shaft 32 and is connected to a rear surface of the mounting guide bracket 28.

Connected to a front surface of the mounting guide bracket 28 is a first or lower gate assembly 38. The first gate assembly 38 has a horizontal support member 40 having a top 42, a bottom 44, a first end 46, and a second end 48. Support member 40 has a hole or aperture 50 that extends through support member 40 from the top 42 to the bottom 44. Extending from the second end 48 to the aperture 50 and in communication with the aperture 50 is a horizontal slot 52.

Slidably received within slot 52 is a gate 54. The gate 54 is of any size, shape, and structure and is adapted to selectively fill and close the aperture 50. The gate 54 is connected to a rod, shaft, or piston 56 that is slidably received within a second cylinder 58. Connected to the top 42 of the horizontal support member 40 and extending upwardly and vertically is a first measuring tube 60. Connected to the bottom 44 of the horizontal support member 40 and extending downwardly and vertically is a discharge tube 62. Both the first measuring tube 60 and the discharge tube 62 are aligned with and in communication with aperture 50.

Connected to the fixed mounting bracket 31, above the first gate assembly 38, is a second or upper gate assembly 64. Like the first gate assembly 38, the second gate assembly has a horizontal support member 40 with a top 42, bottom 44, first end 46, and second end 48, an aperture 50, a horizontal slot 52, a slidable gate 54 connected to a shaft 56 slidably received within a third cylinder 66. The apertures 50 of the first and second gate assemblies 38 and 64 are in vertical spaced alignment.

Connected to the bottom 44 of the second gate assembly 64 and extending downwardly and vertically is a second measuring tube 68. The second measuring tube 68 has a diameter and length smaller than the diameter and length of the first measuring tube 60 and is positioned to be telescopically received within the first measuring tube 60. Also, the discharge opening 20 of the hopper 12 is received within the aperture 50 of the fixed gate assembly 64 and in communication with the second measuring tube 68. The first, second, and third cylinders 30, 58, and 66 are of any type and preferably pneumatic.

Connected to the cylinders 30, 58, and 66 is a control system 70. The control system 70 includes a processor 72, memory 74, software 76, an input device 78, and a display 80. The control system selectively activates the cylinders 30, 58, and 66 to move the gates 54 and measuring tubes 60 and 68 to desired positions.

To calibrate the system 10, based on input to the control system 70 through input device 78, gate assembly 38 is raised by activating the first cylinder 30 to retract which causes the mounting guide bracket 28 to move toward the second gate assembly 64 until a top edge 82 of the first measuring tube 60 engages the bottom 44 of the second gate assembly 64. This arrangement is defined as a minimum measurement position. Gate 54B is extended by second cylinder 58 to a closed position where gate 54B prevents seed flow through aperture 50B into discharge tube 62. Gate 54A of the second gate assembly 68 is retracted by the third cylinder 66 to an open position where seed is permitted to flow from the hopper 12 through discharge opening 20 and aperture 50A into the second measuring tube 68.

Once in the minimum measurement position, small seeds are poured into the hopper 12 and flow through the discharge opening 20 and aperture 50A into a measuring chamber 82 created by the first end and second measuring tubes 60 and 68. Because the length of the second measuring tube 68 is shorter than the length of the first measuring tube 60, the measuring chamber 82 always has an overflow section 83. If the second measuring tube 68 was the same length as the first measuring tube 60, upon extension, the volume of measuring chamber 82 would increase due to length and diameter leading to inaccuracies. The overflow section 83 eliminates these inaccuracies. Also, to eliminate dead space and enhance flow, the ends of the second measuring tube 68 are chamfered. The third cylinder 66 is then activated by the control system 70 to move gate 54A to a closed position that prevents seed flow through aperture 50A. Second cylinder 58 is then activated by the control system 70 to open gate 54B to permit seed from the measuring chamber 82 to flow through aperture 50B and discharge tube 62 and into a measuring container. The weight of the seed in the container for the minimum position is determined by placing the container on a scale 84 and subtracting the weight from the container. The weight of the seed from the minimum position is then entered into the control system 70 using the input device 78 and then stored in memory 74.

To determine the weight of the seed in a maximum position, the process is repeated except that the first cylinder 30 moves the mounting guide bracket 28 away from the first gate assembly 38 to a maximum measuring position. The maximum measuring position is defined by the arrangement where a maximum volume in the measuring chamber 82 is created by the first and second measuring tubes 60 and 68. Once a weight of the seed for the maximum position is determined, this information is entered into the control system 70 and stored.

Once calibrated, an operator, using the input device 78, enters a desired seed weight and/or count. Based upon the input information the processor 72, using the software 76, the maximum and minimum seed weights, stored information that includes seed type and the relationship between seed weight and seed count, and stored information regarding the diameter of the first and second seed meter, the processor determines a position on the rail 26 where movement of the first gate assembly 38 would create a volume within the measuring chamber 82 approximately equal to the amount entered by the operator.

The control system 70 then sends a signal to the first cylinder 30 which moves the mounting guide bracket either toward or away from the second gate assembly 64 to the determined position on the vertical rail 26. The control system 70 also sends a signal to the second and third cylinders 58 and 66 to open gate 54A and close gate 54B.

Small seed is then poured into the hopper 12 and flows into the measuring chamber 82 which has the desired volume. Gate 54A is then closed and gate 54B allowing the small seed from the measured chamber 82 to flow through aperture 50B and discharge tube 62 into a container, bag, package or the like. The process is repeated until completed and one wants to change to a different type of small seed. To drain the hopper 12, the control system 70 opens both gates 54A and 54B.

Accordingly, a small seed counting system has been disclosed that is faster and more accurate and at the very least meets all the stated objectives.

From the above discussion and accompanying figures and claims it will be appreciated that the small seed counting system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A small seed counting system, comprising:
   a hopper mounted to a frame;
   a vertical rail mounted to the frame;
   a first and a second gate assembly mounted to the vertical rail that form an adjustable measuring chamber; and
   a control system operatively connected to the first and second gate assembly and adapted to adjust the volume of the measuring chamber and selectively permit flow of small seed form the hopper through the measuring chamber.

2. The system of claim 1, wherein one of the first and the second gate assemblies is slidably mounted to the vertical rail.

3. The system of claim 1, wherein the measuring chamber has a first measuring tube telescopically received within a second measuring tube.

4. The system of claim 1, wherein the first and the second gate assemblies each have a horizontal support member with an aperture extending from a top to a bottom and slidably received within a slot that extends from an end of the horizontal support to the aperture.

5. The system of claim 1, further comprising a cylinder connected to the control system and mounted to the vertical rail wherein the cylinder is connected to a mounting guide bracket that is slidably mounted to the vertical rail.

6. The system of claim 4, wherein each of the first and the second gate assemblies have a cylinder connected to the gate and the control system.

* * * * *